Figure 1:
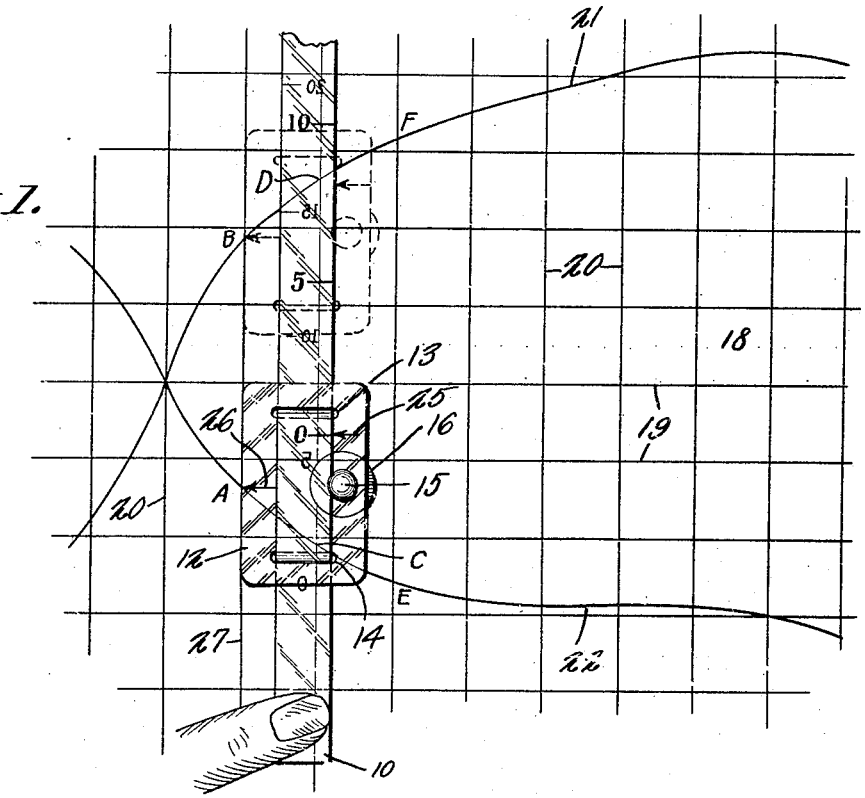
Figure 2:
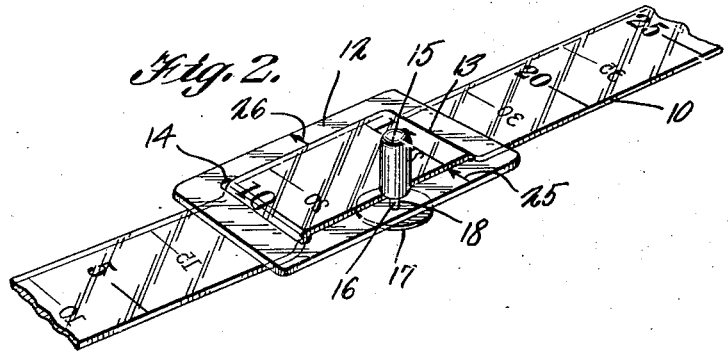

April 13, 1926.                                                                1,581,026
I. SCHWARTZ
METHOD OF PRESENTING AN ANIMATED PICTURE PUZZLE
Filed Dec. 18, 1924
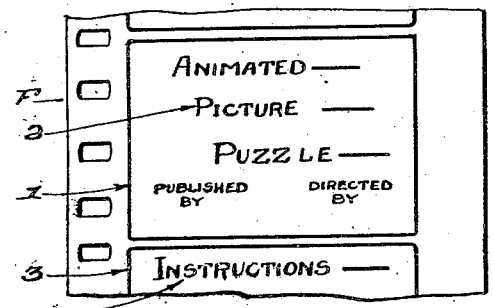
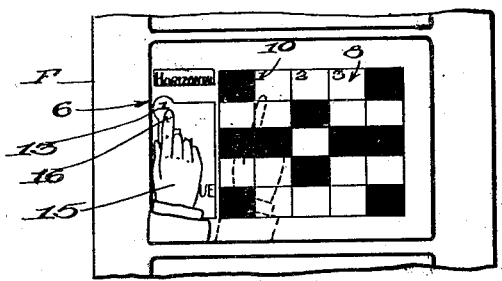
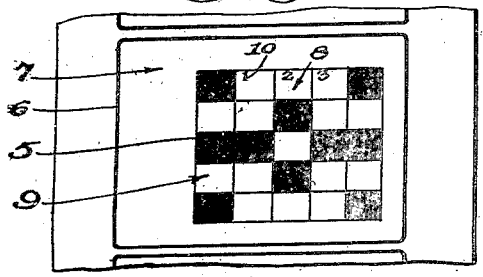
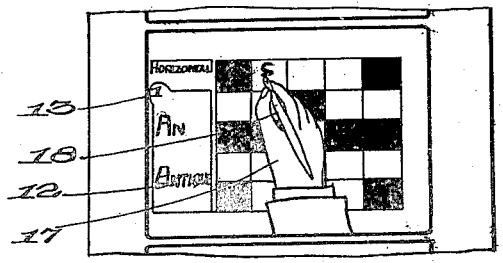
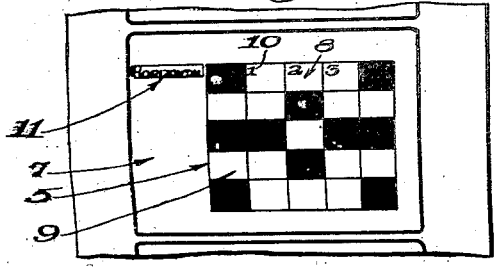
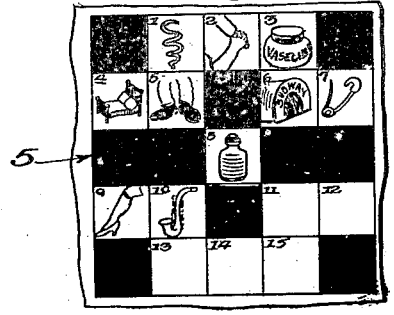
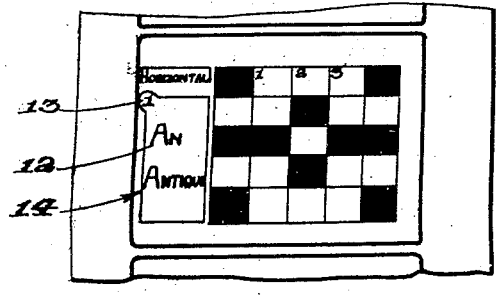
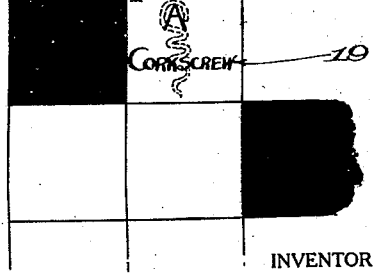
WITNESSES
INVENTOR
Isadore Schwartz.
BY
ATTORNEYS desired outlines and having index numerals, accompanying the chart by a legend making reference to a certain part thereof, exhibiting a puzzle writing with an exponent numeral agreeing with the index numeral of a certain space in said chart, pointing out first the exponent numeral then the index numeral to indicate the place where the answer is expected to appear, picturing a hand with a marking implement going through the motions of drawing in said space and causing the appearance of a pictorial representation suggesting an answer to the question.

3. The method of presenting an animated picture puzzle by photographic projection comprising the progressive steps of exhibiting a chart of suitable shape containing spaces of desired outlines and having index numerals, causing the appearance of a legend relating to a certain part of the chart, exhibiting a puzzle writing having an exponent numeral agreeing with an index numeral in a space, pointing out first the exponent numeral then the index numeral to verify an understanding of the place where the answer is expected to appear, causing the appearance of a written answer at the place thus designated, causing said written answer to dissolve, and causing the appearance of a pictorial representation agreeing with said written answer and being suggestive of an answer to said puzzle writing.

4. The method of presenting a picture puzzle by animated photographic projection comprising the progressive steps of exhibiting a suitable ruled chart having index numerals, exhibiting a puzzle writing having an exponent numeral agreeing with a numeral on the chart and designating a certain location upon the chart, and causing the appearance of a picture at said location intended to suggest an answer to said puzzle writing.

ISADOR SCHWARTZ.

April 13, 1926.

C. H. FOLSOM

MEASURING DEVICE

Filed March 2, 1925.

1,581,047

C. H. Folsom,
INVENTOR

BY Victor J. Evans
ATTORNEY

WITNESS: